United States Patent [19]

Okano

[11] Patent Number: 5,552,910
[45] Date of Patent: Sep. 3, 1996

[54] LIQUID CRYSTAL DISPLAY HAVING ZINC SULFIDE SWITCHING ELEMENTS AND METHOD FOR PRODUCING THE SAME

[75] Inventor: Kiyoshi Okano, Tenri, Japan

[73] Assignee: Sharp Kabushiki Kaisha, Osaka, Japan

[21] Appl. No.: 346,473

[22] Filed: Nov. 29, 1994

[30] Foreign Application Priority Data

Nov. 29, 1993 [JP] Japan ................................ 5-298658

[51] Int. Cl.⁶ ............................................. G02F 1/136
[52] U.S. Cl. ..................................... 359/60; 359/58
[58] Field of Search ........................... 359/58, 57, 60; 257/72, 60

[56] References Cited

U.S. PATENT DOCUMENTS

| | | | |
|---|---|---|---|
| 4,583,087 | 4/1986 | van de Venne | 350/334 |
| 4,775,549 | 10/1988 | Ota et al. | 427/38 |
| 5,274,485 | 12/1993 | Narita et al. | 359/60 |
| 5,396,354 | 3/1995 | Shimada et al. | 359/58 |

FOREIGN PATENT DOCUMENTS

| | | | |
|---|---|---|---|
| 63-221323 | 9/1988 | Japan | 359/60 |
| 1-35352 | 7/1989 | Japan . | |
| 2-308227 | 12/1990 | Japan . | |
| 4-73716 | 3/1992 | Japan . | |
| 2-213974 | 8/1989 | United Kingdom | 359/60 |

OTHER PUBLICATIONS

H. Murray et al., "Conduction in Thin Films," 22 *Thin Solid Films*, pp. 37–44, 1974, Elsevier Sequoia.
M. Fukuzawa et al., "Mechanism of Memory Phenomena in ZnS Films," in *Applied Physics*, vol. 46, No. 7, 1977.
J. E. Adams et al., "Non–Linear Blocking Layer for Matrix Address Displays," *Xerox Disclosure Journal*, vol. 2, No. 3, 1977.
ISBN 4-8443-0406-2 C3055, "Liquid Crystal Display," Sharp Corp., Liquid Crystal Display Division, p. 71 (Sep. 1, 1991).

*Primary Examiner*—William L. Sikes
*Assistant Examiner*—Charles Miller
*Attorney, Agent, or Firm*—David G. Conlin; Milton Oliver

[57] ABSTRACT

A liquid crystal display apparatus which performs a display by modulating an optical characteristic of a display medium, includes: a plurality of pixel electrodes for allowing the display medium to perform a display in accordance with a display signal; switching elements, respectively provided for the corresponding pixel electrodes, for applying the display signal to the respective pixel electrodes in nonlinearly response to a received driving signal; and a bus line for applying the driving signal to the switching elements. Each of the switching elements includes a first active device and a second active device. The first active device includes a lower electrode connected to the corresponding one of the pixel electrodes, an upper electrode connected to the bus line, and a nonlinear resistive layer interposed between the lower electrode and the upper electrode. The second active device includes a lower electrode connected to the bus line, an upper electrode connected to the corresponding pixel electrode, and a nonlinear resistive layer interposed between the lower electrode and the upper electrode. Each of the nonlinear resistive layers of the first and the second active elements contains zinc sulfide as its main component.

30 Claims, 12 Drawing Sheets

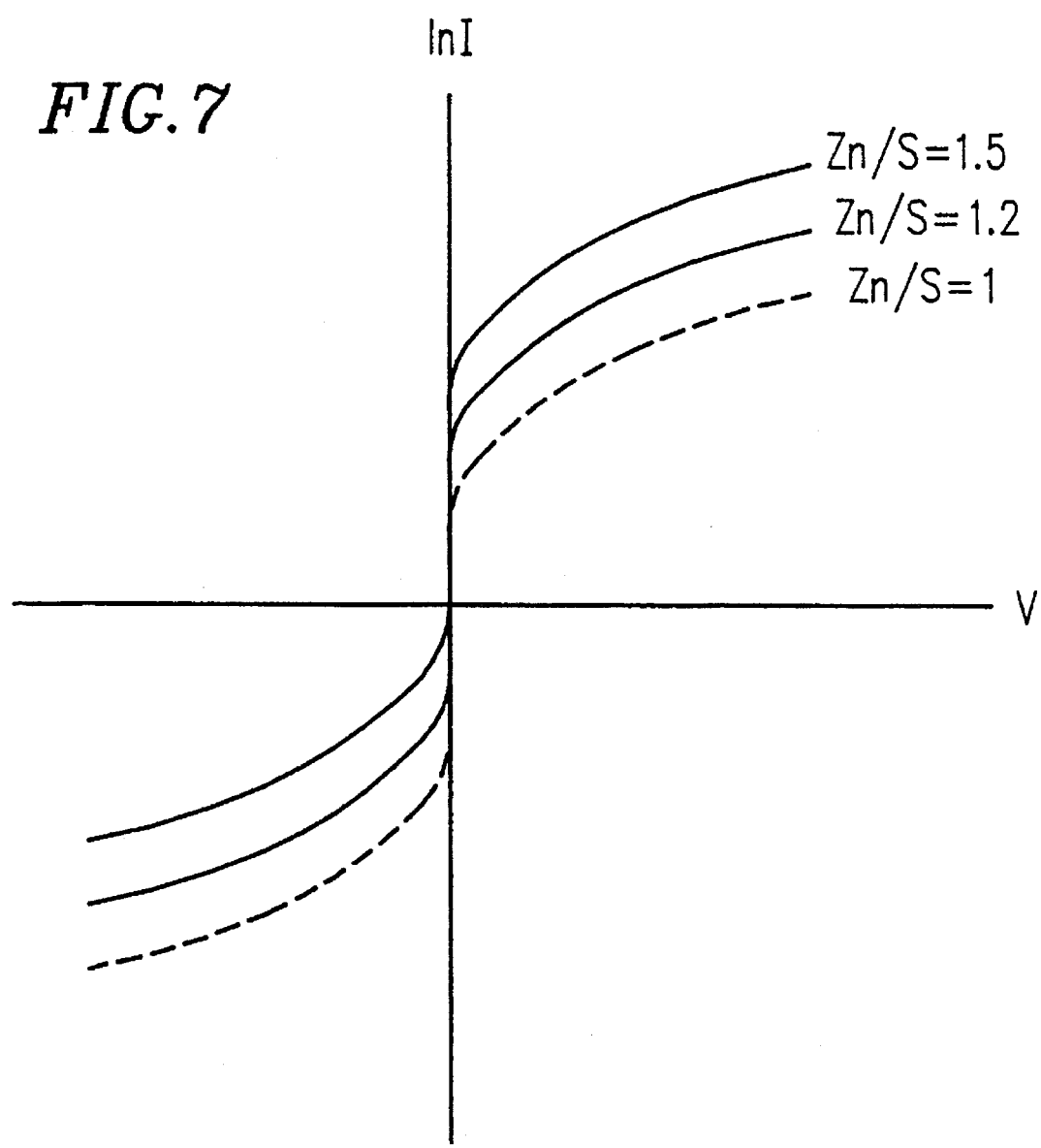

5,552,910

LIQUID CRYSTAL DISPLAY HAVING ZINC SULFIDE SWITCHING ELEMENTS AND METHOD FOR PRODUCING THE SAME

BACKGROUND OF THE INVENTION

1. Field of the Invention

The present invention relates to a liquid crystal display apparatus, and particularly to a liquid crystal display apparatus using a two-terminal nonlinear resistance device.

2. Description of the Related Art

Portable OA equipment such as personal computers have been considerably developed in recent years. Accordingly, the cutting-down of production costs and reduction of power consumption of liquid crystal display (LCD) apparatuses used for such OA equipment have become important challenges.

Among various types of methods for driving such LCD apparatus which are currently used, a simple matrix type is the most promising for cutting down the production costs. Recently, multiple information media have been developed, and a display with multiple gray levels (a full-color display, a multi-color display) has been essentially demanded. However, the simple matrix type has difficulty in realizing the display with multiple gray levels. Accordingly, a method in which each pixel is provided with an active device (a switching device) is proposed.

A typical active device is a thin film transistor (TFT). However, during the production process, a TFT requires a large number of masks to be used in photolithography, so the production yield is decreased and the production cost is disadvantageously increased. On the other hand, a thin film diode (TFD) which is one type of active device only requires about three masks to be used in the production process, so that the price of the device can be lowered. Among such TFDs currently used, a metal-insulator-metal (MIM) device having a nonlinear resistive layer of tantalum oxide ($Ta_2O_5$) is widely used.

FIG. 12A shows the general structure of one pixel in a conventional LCD apparatus with an MIM device. FIG. 12B shows the cross section taken along the line a—a in FIG. 12A. Such a conventional structure is described, for example, in "Liquid Crystal Display", Sharp Corp., Liquid Crystal Display Division, p. 71, and Japanese Patent Publication No. 1-35352. The MIM device includes, on a glass substrate 31, a lower electrode 32 of tantalum (Ta) or the like, a nonlinear resistive layer 33 of tantalum oxide ($Ta_2O_5$) or the like, and an upper electrode 34 of chromium (Cr) or the like, in this order from the substrate 31. The nonlinear resistive layer 33 is often formed by anodization of the lower electrode 32.

The upper electrode 34 of the MIM device having the above-described structure has end portions which are overlapped by a part of pixel electrode 35, so as to be connected to the pixel electrode 35. The pixel electrode 35 is formed from a transparent conductive film of indium tin oxide (ITO) or the like.

However, the conventional MIM device having the nonlinear resistive layer of $Ta_2O_5$ has the following problems. First, the current-to-voltage (I—V) characteristic as a two-terminal device is not sufficiently steep, i.e., the ON/OFF ratio is not high enough. In general, in the MIM device having the nonlinear resistive layer of $Ta_2O_5$, $I_{20V}/I_{5V}$ is nearly equal to about $10^3$, where $I_{20V}$ and $I_{5V}$ are current values when an ON voltage of 20 V and an OFF voltage of 5 V are applied, respectively. It is difficult to achieve multiple gray levels by using an MIM device having such an ON/OFF ratio.

Secondly, the I—V characteristic of the conventional MIM device exhibits poor symmetrical property with respect to the polarity of the applied voltage. The nonlinear resistive layer of the MIM device is formed by anodizing the lower electrode, as described above. On the other hand, the upper electrode is often deposited by sputtering on the nonlinear resistive layer. Because the formation methods are different, the condition at the interface between the nonlinear resistive layer and the lower electrode is different from the condition at the interface between the nonlinear resistive layer and the upper electrode. This difference in condition may result in asymmetry of current conductivity. In the case where the material for the upper electrode is different from the material for the lower electrode, the asymmetry of the I—V characteristic can more significantly appear. Such electric asymmetry may cause a bias voltage to be applied to liquid crystal when the liquid crystal is driven, so that there arises a problem in that flickering may occur.

In order to eliminate such electrical asymmetry, a so-called ring structure and a back-to-back structure in which a plurality of conventional nonlinear devices are combined are proposed (see Japanese Laid-Open Patent Publication Nos. 2-308227 and 4-73716, and the like). However, in such structures, since each nonlinear resistance device is an MIM device having a nonlinear resistive layer of $Ta_2O_5$, it is impossible to achieve sufficient steepness in the I—V characteristic.

In addition, in the structure of the conventional MIM device shown in FIG. 12A, the upper electrode and the lower electrode are crossed, so that the nonlinear resistive layer includes a stepped portion in a region functioning as an active device. In such stepped portion, leakage current may easily occur.

SUMMARY OF THE INVENTION

The liquid crystal display apparatus of this invention is used for performing a display by modulating an optical characteristic of a display medium. The display apparatus includes: a plurality of pixel electrodes for allowing the display medium to perform a display in accordance with a display signal; switching elements, respectively provided for the corresponding pixel electrodes, for applying the display signal to the respective pixel electrodes in nonlinearly response to a received driving signal; and a bus line for applying the driving signal to the switching elements. In the display apparatus, each of the switching elements includes a first active device and a second active device; the first active device includes a lower electrode connected to a corresponding one of the pixel electrodes, an upper electrode connected to the bus line, and a nonlinear resistive layer interposed between the lower electrode and the upper electrode; the second active device includes a lower electrode connected to the bus line, an upper electrode connected to the corresponding pixel electrode, and a nonlinear resistive layer interposed between the lower electrode and the upper electrode; each of the nonlinear resistive layers of the first and the second active elements contains zinc sulfide as its main component.

According to another aspect of the invention, a liquid crystal display apparatus for performing a display by modulating an optical characteristic of a display medium is provided. The display apparatus includes: a plurality of pixel electrodes for allowing the display medium to perform a display in accordance with a display signal; switching elements, respectively provided for the corresponding pixel electrodes, for applying the display signal to the respective pixel electrodes in nonlinearly response to a received driving signal; and a bus line for applying the driving signal to the switching elements. In the display apparatus, each of the switching elements includes a first active device and a second active device; the first active device includes a lower electrode connected to a corresponding one of the pixel electrodes, an upper electrode, and a nonlinear resistive layer interposed between the lower electrode and the upper electrode; the second active device includes a lower electrode connected to the bus line, an upper electrode connected to the upper electrode of the first active device, and a nonlinear resistive layer interposed between the lower electrode and the upper electrode; each of the nonlinear resistive layers of the first and the second active elements contains zinc sulfide as its main component.

In one embodiment of the invention, each of the first and the second active devices includes an insulating film formed between the upper electrode and the nonlinear resistive layer, and the upper electrode is connected to the nonlinear resistive layer via a through-hole provided through the insulating film.

In another embodiment of the invention, the lower electrode of the first active device is part of the corresponding pixel electrode, and the lower electrode of the second active device is part of the bus line.

In another embodiment of the invention, the plurality of pixel electrodes are made of the same material as that of the bus line.

In another embodiment of the invention, the first active device includes an island-like electrode formed of the same material as that for the bus line, the island-like electrode being formed between the part of the corresponding pixel electrode and the nonlinear resistive layer.

In another embodiment of the invention, the zinc sulfide which is the main component of the nonlinear resistive layers contains an element selected from a group consisting of rare earth elements, III-group elements, iron, nickel, copper, manganese, and compounds thereof.

In another embodiment of the invention, a composition ratio of zinc to sulfur in zinc sulfide, which is the main component of the nonlinear resistive layers, is different from a stoichiometric ratio.

In another embodiment of the invention, the insulating layer is an organic type photosensitive resin.

According to another aspect of the invention, the liquid crystal display apparatus includes: a first substrate having a plurality of pixel electrodes, nonlinear resistance devices provided for the respective pixel electrodes, and a bus line for operating the nonlinear resistance devices; a second substrate which faces the first substrate; and a display medium interposed between the first and the second substrates. In the display apparatus, each of the nonlinear resistance devices includes: a first nonlinear resistive layer formed on a predetermined portion of a corresponding one of the pixel electrodes; a second nonlinear resistive layer formed on a predetermined portion of the bus line, the second nonlinear resistive layer is separated and insulated from the first nonlinear resistive layer; an insulator layer which covers the first and the second nonlinear resistive layers, and has a first through-hole positioned above the first nonlinear resistive layer and a second through-hole positioned above the second nonlinear resistive layer; a first connecting electrode for connecting the first nonlinear resistive layer to the bus line via the first through-hole; and a second connecting electrode for connecting the second nonlinear resistive layer to the pixel electrode via the second through-hole. In the display apparatus, each of the first and the second nonlinear resistive layers contains zinc sulfide as its main component.

According to another aspect of the invention, a liquid crystal display apparatus includes: a first substrate having a plurality of pixel electrodes, nonlinear resistance devices provided for the respective pixel electrodes, and a bus line for operating the nonlinear resistance devices; a second substrate which faces the first substrate; and a display medium interposed between the first and the second substrates. In the display apparatus, each of the nonlinear resistance devices includes: a first nonlinear resistive layer formed on a predetermined portion of a corresponding one of the pixel electrodes; a second nonlinear resistive layer formed on a predetermined portion of the bus line, the second nonlinear resistive layer is separated and insulated from the first nonlinear resistive layer; an insulator layer which covers the first and the second nonlinear resistive layers, and has a first through-hole positioned above the first nonlinear resistive layer and a second through-hole positioned above the second nonlinear resistive layer; and a connecting electrode connected to the first nonlinear resistive layer via the first through-hole, and connected to the second nonlinear resistive layer via the second through-hole. In the display apparatus, each of the first and the second nonlinear resistive layers contains zinc sulfide as its main component.

In one embodiment of the invention, the plurality of pixel electrodes are made of the same material as that for the bus line.

In another embodiment of the invention, an island-like electrode is formed between the pixel electrode and the first nonlinear resistive layer, the island-like electrode being formed of the same material as that for the bus line.

In another embodiment of the invention, the zinc sulfide, which is the main component of the first and the second nonlinear resistive layers, contains an element selected from a group consisting of rare earth elements, III-group elements, iron, nickel, copper, manganese, and compounds thereof.

In another embodiment of the invention, a composition ratio of zinc to sulfur in zinc sulfide, which is the main component of the first and the second nonlinear resistive layers, is different from a stoichiometric ratio.

In another embodiment of the invention, the insulating layer is an organic type photosensitive resin.

According to another aspect of the invention, a method for producing a liquid crystal display apparatus is provided. The method includes the steps of: forming a pixel electrode by patterning a first conductor on an insulating substrate; forming a bus line by patterning a second conductor on the insulating substrate; forming a first nonlinear resistive layer containing zinc sulfide as its main component on a predetermined portion of the pixel electrode, and forming a second nonlinear resistive layer containing zinc sulfide as its main component on a predetermined portion of the bus line, the first nonlinear resistive layer and the second nonlinear resistive layer being separated and insulated from each other; forming an insulator layer for covering the first and the second nonlinear resistive layers, the insulator layer having a first through-hole positioned above the first nonlinear resistive layer and a second through-hole positioned above the second nonlinear resistive layer; and forming a first connecting electrode for connecting the first nonlinear resistive layer to the predetermined portion of the bus line via the first through-hole, and forming a second connecting electrode for connecting the second nonlinear resistive layer to the predetermined portion of the pixel electrode via the second through-hole.

According to another aspect of the invention, a method for producing a liquid crystal display apparatus is provided. The method includes the steps of: forming a pixel electrode by patterning a first conductor on an insulating substrate; forming a bus line by patterning a second conductor on the insulating substrate; forming a first nonlinear resistive layer containing zinc sulfide as its main component on a predetermined portion of the pixel electrode, and forming a second nonlinear resistive layer containing zinc sulfide as its main component on a predetermined portion of the bus line, the first nonlinear resistive layer and the second nonlinear resistive layer being separated and insulated from each other; forming an insulator layer for covering the first and the second nonlinear resistive layers, the insulator layer having a first through-hole positioned above the first nonlinear resistive layer and a second through-hole positioned above the second nonlinear resistive layer; and forming a connecting electrode connected to the first nonlinear resistive layer via the first through-hole, and connected to the second nonlinear resistive layer via the second through-hole.

In one embodiment of the invention, the first conductor is the same material as the second conductor, and the step of forming the bus line and the step of forming the pixel electrode are simultaneously performed.

In another embodiment of the invention, in the step of forming the bus line, an island-like electrode which covers the predetermined portion of the pixel electrode is simultaneously formed of the second conductor.

Thus, the invention described herein makes possible the advantages of providing (1) an LCD apparatus having advantages in that (a) the current-to-voltage characteristic of a two-terminal device exhibits sufficient steepness, and the ON/OFF ratio is high, (b) the symmetric properties of current conductivity at the upper and lower interfaces of the nonlinear resistive layer of the two-terminal device are improved, and (c) the leakage current in the two-terminal device portion is prevented from occurring, and (2) providing a method for producing the LCD apparatus having the two-terminal device.

These and other advantages of the present invention will become apparent to those skilled in the art upon reading and understanding the following detailed description with reference to the accompanying figures.

BRIEF DESCRIPTION OF THE DRAWINGS

FIG. 7 is a diagram showing the I—V characteristic in the case where the composition ratio of Zn to S in the ZnS film in the invention.

DESCRIPTION OF THE PREFERRED EMBODIMENTS

In this invention, a material containing zinc sulfide (ZnS) as the main component is used for a nonlinear resistive layer of a two-terminal device, so as to achieve an I—V characteristic whose steepness is higher than that of tantalum oxide (ON/OFF ratio of the material containing ZnS: $I_{20V}/I_{5V} \leq 10^4$). In addition, the I—V characteristic of the nonlinear resistive layer is varied by doping ZnS with a rare earth element, a III-group element, a transition element such as iron, nickel, copper, and manganese, or a compound thereof, or by shifting the composition ratio of Zn to S in ZnS from the stoichiometric ratio.

In addition, by combining two nonlinear resistance devices using ZnS, a ring structure or a back-to-back structure is formed, so that the poor symmetric property of the current conductivity which constitutes a problem of a conventional MIM device can be improved.

The ZnS film in an initial stage of crystal growth includes very minute grains (the ZnS film in this stage is sometimes referred to as a dead layer), and then the ZnS film is grown to be a polycrystalline film in a columnar manner. Accordingly, the surface of the ZnS film may often cause differences in level. If such a ZnS film is used for a nonlinear resistance device, the current-to-voltage characteristic tends to be asymmetric. The current-to-voltage characteristic can be improved by using the ring structure or the back-to-back structure as in this invention, and a two-terminal device which positively utilizes the characteristics of the ZnS film can be formed.

Figure 14:
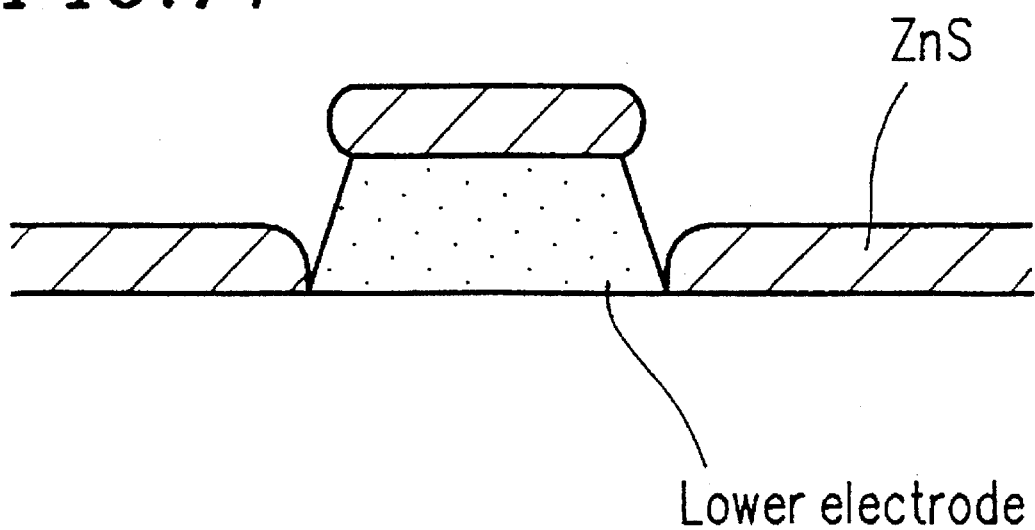
FIG. 14 is a diagram for illustrating a discontinuous ZnS film due to a stepped portion.

In addition, in the two-terminal device of this invention, the connection to the nonlinear resistive layer is realized via a through-hole provided above the lower electrode, so that any stepped portion is not caused in the nonlinear resistive layer in the device portion, and hence the current leakage at the site can be prevented. As will be described in detail later, in order to form a two-terminal device suitable for driving liquid crystal, it is necessary to make the ZnS film thinner. In the case where a ZnS film is formed so as to cover a lower electrode, if the ZnS film is a lot thinner than the lower electrode, the ZnS film may be discontinuous due to a stepped portion at the edge of the lower electrode (see FIG. 14). In the case where the upper electrode is formed so as to cover the discontinuous ZnS film on the edge of the lower electrode, the current may easily leak through the discontinuous portion at the edge. According to the invention, the device is formed by using an upper face portion (excluding the edge) of the lower electrode, in order to prevent the leakage current that is caused when making the ZnS film thinner.

First, the properties of the ZnS film will be described. It is known that there are mainly two types of I—V characteristics of the ZnS film in a two-terminal device: the Poole-Frankel characteristic and the switching characteristic. The switching characteristic indicates a high resistance state and a low resistance state. The Poole-Frankel characteristic is described, for example, in H. Murry, Thin Solid Films 22 (1974) 37, and the switching characteristic is described in Masahiro Fukuzawa, Applied Physics (Ohyo Butsuri) Vol. 46, No. 7 (1977).

Figure 13:
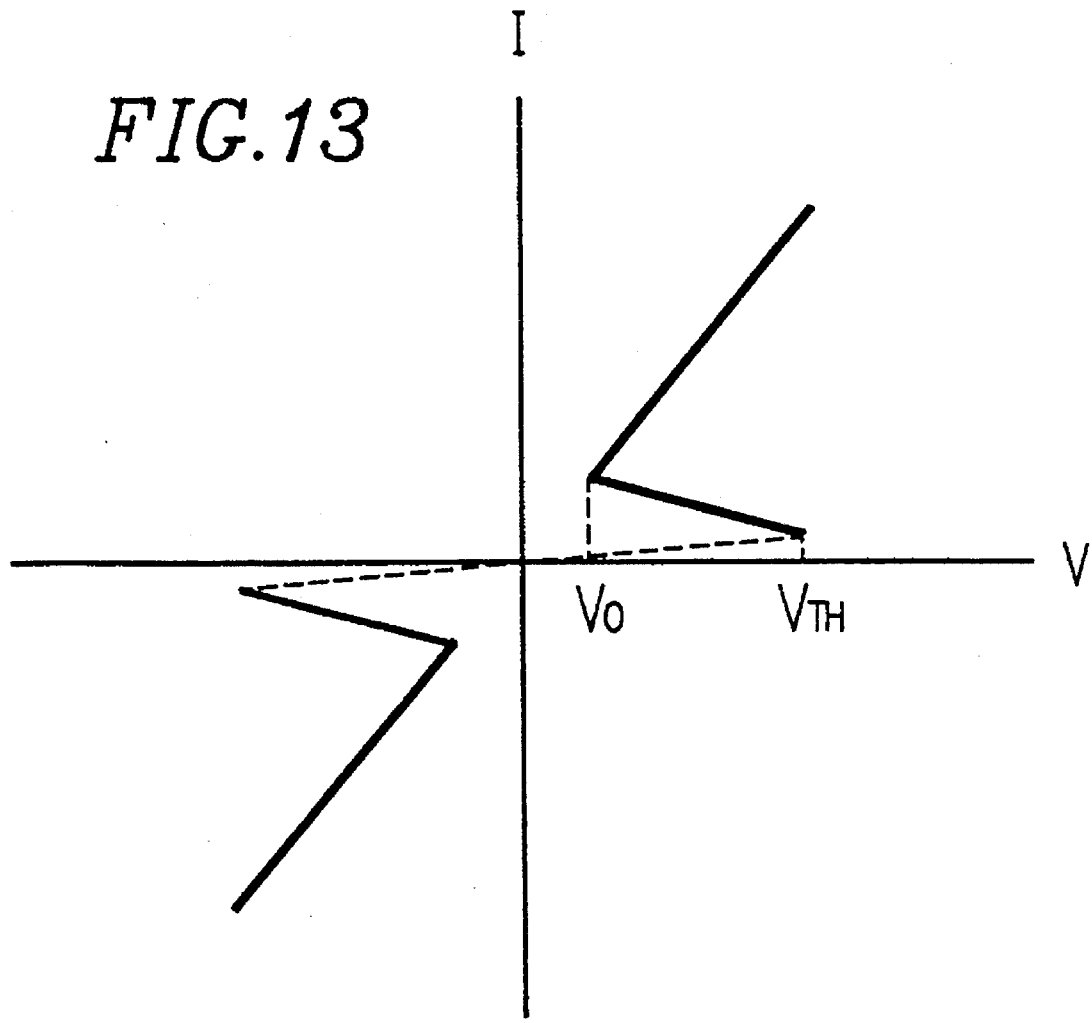
FIG. 13 is a diagram showing the I—V characteristic of a conventional ZnS film.

FIG. 13 is a graph illustrating the curve representing the I—V characteristic of the conventional ZnS film which indicates the switching characteristic. As is apparent from FIG. 13, the resistance of the ZnS film drastically changes at the threshold level of the applied voltage, and thus the curve representing the I—V characteristic is discontinuous. The electrical characteristics of the ZnS film around the threshold level of the applied voltage is extremely unstable and is not reliable. A film having such an I—V characteristic is not suitable for a display apparatus. By appropriately selecting the thickness of the ZnS film, an I—V characteristic showing a continuous curve can be obtained. In this specification, a continuous curve of the I—V characteristic means that the current continuously varies with respect to the applied voltage and the curve representing the I—V characteristic shows a continuous change.

Figure 1:
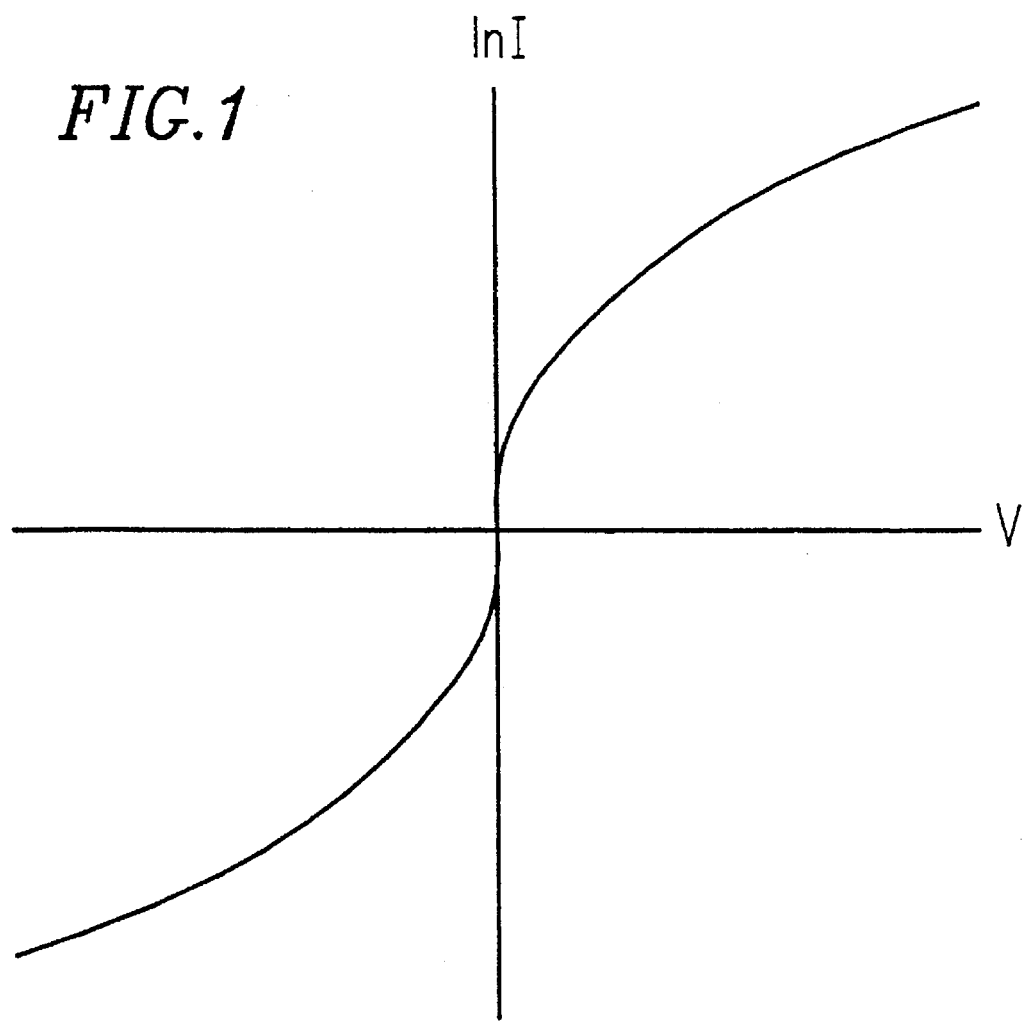
FIG. 1 is a diagram showing the I—V characteristic of a ZnS film in this invention.

FIG. 1 shows a curve representing the I—V characteristic of a ZnS film used in the present invention. In the present invention, a ZnS thin film which realizes an I—V characteristic showing a continuous curve is used, and therefore the I—V characteristic is stable even around the threshold level of the applied voltage. Moreover, the I—V characteristic of the ZnS film is better in steepness than that of the insulating layer of an MIM device formed of $Ta_2O_5$. This means that the ZnS film used in the present invention is suitable for the switching device.

Hereinafter, the present invention will be described by way of illustrative examples with reference to the accompanying drawings.

EXAMPLE 1

Figure 2:
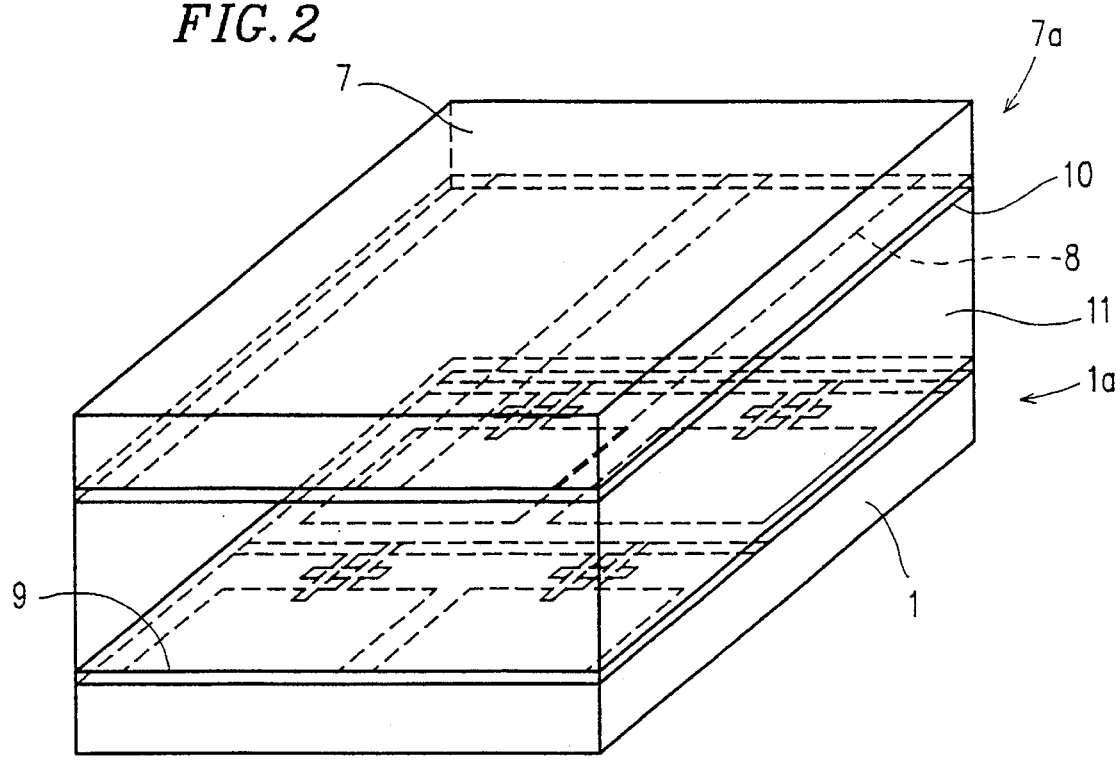
FIG. 2 is a perspective view showing an LCD apparatus in Example 1 according to the invention.
Figure 3A:
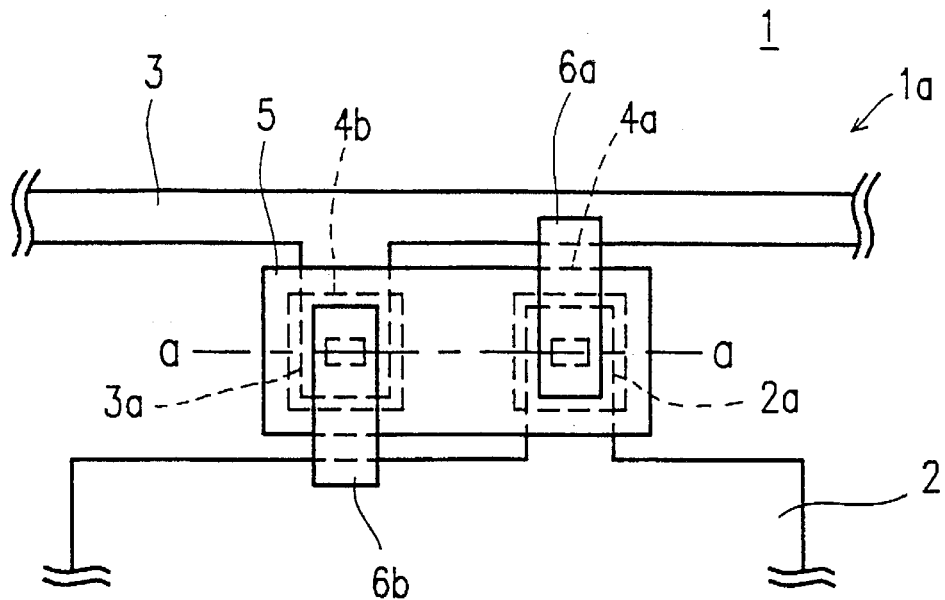
FIG. 3A is a plan view showing a two-terminal device portion corresponding to one pixel on a substrate with devices of the LCD apparatus in Example 1 according to the invention.
Figure 3B:
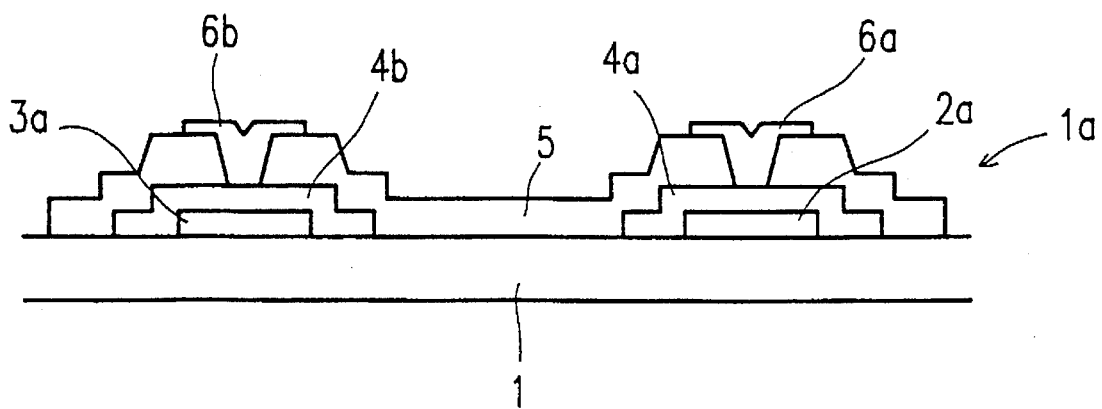
FIG. 3B is a cross-sectional view taken along the line a—a in FIG. 3A.

FIG. 2 is a perspective view showing a part of an LCD apparatus in Example 1 of the invention. FIG. 3A is a plan view showing one part portion of a substrate with devices of the LCD apparatus. FIG. 3B shows a cross section taken along the line a—a in FIG. 3A. The LCD apparatus is of a reflection type. As shown in FIG. 2, a substrate 1a having devices and a counter substrate 7a are disposed so as to face each other and a liquid crystal layer 11 as a display medium is sandwiched therebetween.

As shown in FIGS. 3A and 3B, in the substrate 1a, a pixel electrode 2 formed of a first conductor (electrically conductive material) and a bus line 3 formed of a second conductor are formed on a glass substrate 1. In this example, the first conductor is tantalum (Ta) and the second conductor is also Ta. These conductors can be desirably selected from other materials instead of Ta. The pixel electrode 2 includes a branched protrusion 2a extending toward the bus line 3, and the bus line 3 includes a branched protrusion 3a extending toward the pixel electrode 2.

A first nonlinear resistive layer 4a and a second nonlinear resistive layer 4b are formed so as to overlap the protrusions 2a and 3a of the pixel electrode 2 and the bus line 3, respectively. The main component of the nonlinear resistive layer in this invention is zinc sulfide (ZnS) which is a compound semiconductor. For simplicity, in the following description, a film containing ZnS as its main component is referred to as a ZnS film.

An insulator film 5 is formed so as to cover the entire of the first and second nonlinear resistive layers 4a and 4b. The insulator layer 5 has throughholes 12a and 12b at positions corresponding to the first and second nonlinear resistive layers 4a and 4b. A first connecting electrode 6a of a third conductor is formed on the insulator layer 5 in a portion corresponding to the first nonlinear resistive layer 4a, and connected to the bus line 3. The third conductor is aluminum (Al). Similarly, a second connecting electrode 6b of the third conductor is formed on the insulator layer 5 in a portion corresponding to the second nonlinear resistive layer 4b, and connected to the pixel electrode 2. The first connecting electrode 6a is connected to the first nonlinear resistive layer 4a via the first through-hole 12a positioned above the first nonlinear resistive layer 4a, whereby the first nonlinear resistive layer 4a and the bus line 3 are electrically connected to each other. Similarly, the second connecting electrode 6b is connected to the second nonlinear resistive layer 4b via the second through-hole 12b positioned above the first nonlinear resistive layer 4b, whereby the second nonlinear resistive layer 4b and the pixel electrode 2 are electrically connected to each other.

Figure 11A:
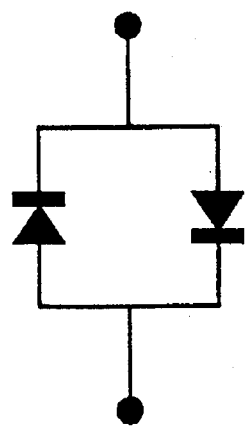
FIG. 11A is an equivalent circuit diagram of a two-terminal device having a ring structure in the LCD apparatus in Example 1 according to the invention.

The LCD apparatus having the above construction includes a first switching device and a second switching device. The first switching device has an MSM (Metal-Semiconductor-Metal) three-layer structure. The MSM structure of the first switching device includes the protrusion 2a of the pixel electrode 2, the first connecting electrode 6a, and the first nonlinear resistive layer 4a interposed therebetween. The second switching device also has an MSM three-layer structure. The MSM structure of the second switching device includes the protrusion 3a of the bus line 3, the second connecting electrode 6b, and the second nonlinear resistive layer 4b interposed therebetween. The first and second switching devices are coupled in parallel at opposite polarities, so as to form a ring structure. The equivalent circuit of the ring structure is shown in FIG. 11A.

Figure 4A:
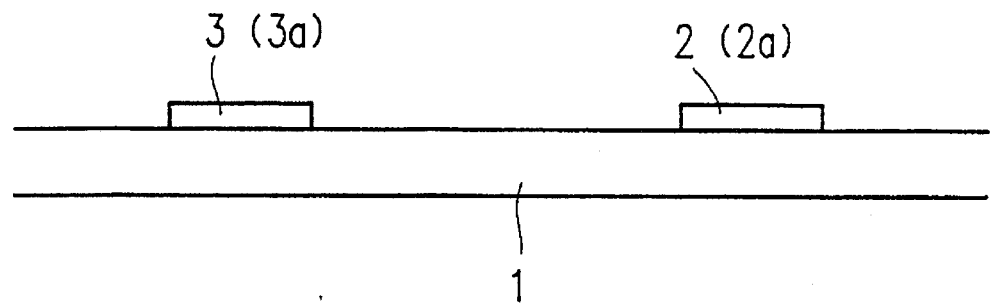
FIGS. 4A, 4B and 4C are cross-sectional views for illustrating the production process of the substrate with devices of the LCD apparatus in Example 1 according to the invention.

Next, the production process of the LCD apparatus having the above-described construction will be described with reference to FIGS. 4A to 4C. These figures show a cross section taken along the line a—a in FIG. 3A.

First, the substrate 1a is produced in the following manner. On the entire surface of the glass substrate 1 (e.g., borosilicate glass #7059 manufactured by Corning Inc. ), a Ta film is deposited by sputtering so as to have a thickness of about 300 nm.

Next, after a series of process steps such as photoresist application, exposure, and development (hereinafter, the series of process steps are referred to as the photolithography process), etching is performed by RIE (reactive ion etching) using a mixed gas plasma of $CF_4$ and $O_2$, which is one method of dry etching. As a result of these process steps, a pixel electrode 2 and the bus line 3 are formed as shown in FIG. 4A (FIG. 4A shows protrusions 2a and 3a thereof).

Next, a ZnS film is deposited so as to have a predetermined thickness on the entire display area of the glass substrate 1 by sputtering. The thickness of the ZnS layer is determined as follows based on the driving voltage for the LCD apparatus, i.e, the voltage which is necessary to cause liquid crystal molecules in the liquid crystal layer 11 of the display medium to display an image.

When an electric field applied to the ZnS film reaches a certain level, the current suddenly flows in the ZnS film. Such a specific level is referred to as the threshold level of the electric field (or withstand voltage). The threshold voltage depends on the thickness of the ZnS film. Accordingly, the thickness of the ZnS film is determined so that the voltage applied to the liquid crystal layer will reach the driving voltage for display when the voltage applied to the ZnS film exceeds the threshold level, i.e. when the ZnS film as the switching device is turned "ON".

The threshold level of the electric field is in proportion to the thickness of the ZnS film. If the thickness is equal to or less than 10 nm, the I—V characteristic is unstable. If the thickness is equal to or more than 1 μm, the steepness of the I—V characteristic declines. Accordingly, in order to obtain a stable and steep I—V characteristic, the thickness of the ZnS film should be between 10 nm and 1 μm, preferably 30 nm to 200 nm inclusive.

More specifically, in order to set the driving voltage $V_{op}$ input from the driving circuit of a liquid crystal display apparatus to a level suitable for practical use ($V_{op(max)}$<25 V), it is necessary to make the thickness of the ZnS film equal to or less than 200 nm. As the thickness of the ZnS film is increased, the degree of asymmetry in crystal structure is increased (due to the increase in roughness of the ZnS film surface and the crystal growth in a columnar manner). Accordingly, in order to obtain the current-to-voltage characteristic with good symmetry, it is preferred that the ZnS film is formed so as to be thin enough, and the thickness of the ZnS film is set in the range of 30 nm to 200 nm.

As the sputtering target, a highly pure, sintered ZnS target is used. Alternatively, highly pure ZnS powders which are densely spread all over a quartz glass plate may be used. The sputtering is performed using argon (Ar) as the sputtering gas, at the substrate temperature of 200° C., with the gas pressure of 1 Pa and input power of 0.5 W/cm$^2$.

The ZnS film may be formed by CVD, EB evaporation, MBE (molecular beam epitaxy), ALE (atomic layer epitaxy), or by other thin film formation methods instead of sputtering. As a sputtering gas, instead of Ar, a mixed gas of Ar and hydrogen sulfide, or the like can be used. By varying the ratio of Ar to hydrogen sulfide of the mixed gas, it is possible to control the composition ratio of the ZnS film. In this example, the thickness of the ZnS film is 150 nm.

Figure 4B:
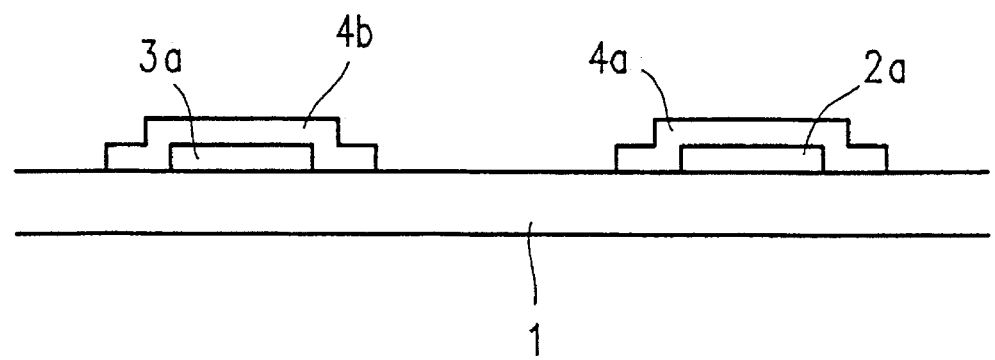
Figure 4C:
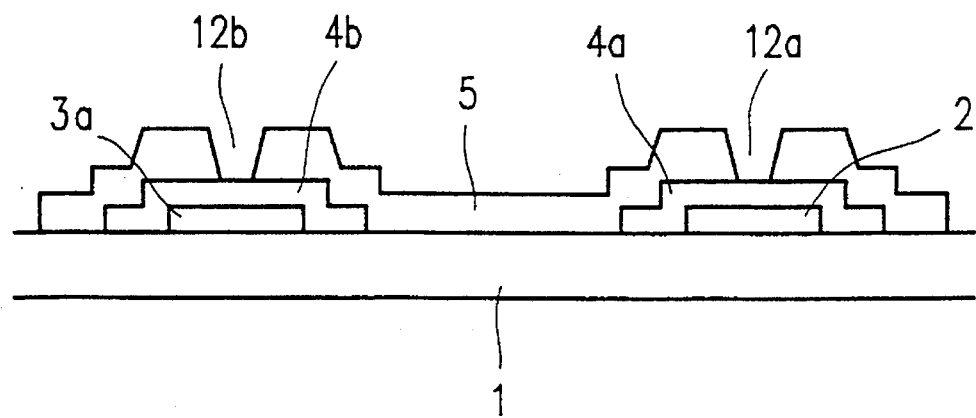

Next, etching is performed using hydrochloric acid or the like as an etchant, so as to form the first nonlinear resistive layer 4a and the second nonlinear resistive layer 4b which are patterned into separate and independent island-like shapes, as shown in FIG. 4B.

Next, by spinner coating, an organic-type insulating photosensitive resin is applied on the entire surface of the glass substrate 1. The photosensitive resin has a thickness of about 500 nm, in this example. After the exposure using a photomask, development is performed using a prescribed developer, so as to form the insulator layer 5 having through-holes 12a and 12b in an island-like pattern. The insulator layer 5 is patterned so as to completely cover the first and second nonlinear resistive layers 4a and 4b (see FIG. 3A).

The formation of the insulator layer using the photosensitive resin has an advantage that the process can be simplified compared with other methods for forming an insulating film. As the photosensitive resin, for example, acrylic resin, polyimide, polyamide, polymethyl methacrylate, and the like may be used.

Next, an Al film is deposited by sputtering so as to have a thickness of about 300 nm, and then the photolithography process is performed. Thereafter, the patterning is performed by wet etching by using phosphoric acid, or a mixed acid of phosphoric acid, nitric acid, and acetic acid, the first connecting electrode 6a and the second connecting electrode 6b are formed, as shown in FIG. 3B. At this time, when the Al film is etched, the nonlinear resistive layers 4a and 4b are protected from the etchant, because the nonlinear resistive layers 4a and 4b are covered with the Al layer and the insulator layer 5 under the photoresist. Therefore, the nonlinear resistive layers 4a and 4b may be formed of materials with poor resistance to the etchant.

The ZnS film is easily corroded by acid, so the portion of the ZnS film used as the nonlinear resistance device is required to be completely covered with a layer formed thereon (such as the upper electrode) when the upper electrode (or the pixel electrode) is to be etched. Otherwise, when the upper electrode is etched by wet etching, the ZnS film positioned directly under the upper electrode is often etched from the side faces thereof. According to the construction of the invention, the nonlinear resistive layers (ZnS) 4a and 4b are covered with the Al layer and the insulator layer 5 under the photoresist, so that the corrosion by etchant can be prevented.

Next, the counter substrate 7a is produced in the following manner. As shown in FIG. 2, a transparent conductive film of ITO is formed on a glass substrate 7, and the film is patterned into a striped shape, so as to form counter electrodes 8. As a result, the counter substrate 7a is formed. The production order of the substrate 1a and the counter substrate 7a can be reversed. In other words, the counter substrate 7a can be produced prior to the production of the substrate 1a. Alternatively, the substrate 1a and the counter substrate 7a may be simultaneously produced.

Next, polyimide (PI) is applied to the substrate 1a, so as to form an alignment film 9. In a similar way, an alignment film 10 is formed on the counter substrate 7a. Then, a rubbing treatment is performed on the surfaces of both of the alignment films.

Then, the substrate 1a and the counter substrate 7a are disposed so as to face each other, and a liquid crystal layer 11 is formed between the substrates 1a and 7a. FIG. 2 shows a portion including several pixels of the LCD apparatus.

The thus produced LCD apparatus includes a switching device (an active device) having an MSM (Metal-Semiconductor-Metal) structure using ZnS which is a compound semiconductor as the nonlinear resistive layer. In the I—V characteristic of the active device, the ON/OFF ratio, i.e., $I_{20V}/I_{5V}$ is 105. This shows that the I—V characteristic achieves very high steepness as compared with the conventional MIM device using $Ta_2O_5$ as the nonlinear resistive layer.

Figure 5:
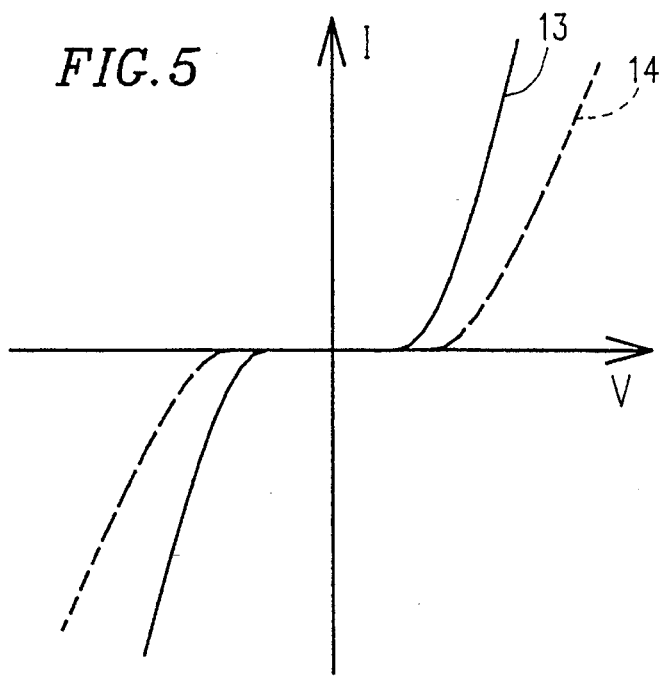
FIG. 5 is a diagram showing the I—V characteristic of an active device in Example 1 of the invention and the I—V characteristic of a conventional active device for comparison.

FIG. 5 shows the I—V characteristic of the MSM active device in this example indicated by curve 13 and the I—V characteristic of a conventional MIM active device indicated by curve 14 for comparison. As is understood from FIG. 5, in the case where ZnS is used as the nonlinear resistive film, the I—V characteristic increases in steepness. In addition, the ring structure improves the symmetry with respect to the polarity of the applied voltage.

The composition ratio of Zn to S of ZnS used for the nonlinear resistive layers 4a and 4b is not necessarily determined by the stoichiometry (i.e., the ratio in number between Zn atoms and S atoms=1:1). By shifting the composition ratio of Zn to S from the stoichiometric ratio, the I—V characteristic of the active device can be changed. In addition, in order to enhance the performance of the active device, ZnS may be doped with a small dose of an element selected from rare earth elements such as terbium (Tb), samarium (Sm), and europium (Eu), the III-group elements such as aluminum and gallium, manganese, copper, and a compound thereof.

Hereinafter, a method for forming a ZnS film containing impurities such as those described above will be described. For example, if manganese is implanted into a ZnS film, the following method is performed. When a ZnS film is deposited by sputtering, the target obtained by doping manganese in a sintered ZnS target is used. Alternatively, the target may be obtained by mixing manganese in highly pure ZnS powders and then densely spreading the resultant mixture all over a quartz glass plate. In this manner, manganese is implanted into the ZnS film. By implanting manganese into the ZnS film, the withstand voltage of the ZnS film is improved, and thus the reliability of the two-terminal device can be enhanced.

Alternatively, if the target ZnS powers are mixed with powders of transition elements such as copper, iron, nickel, and chromium, rare earth elements representative of Tb, Sm, Eu, and the like, or compounds of these rare earth elements such as oxide, fluoride, carbonate, phosphorate, oxalate, chloride, bromide, iodide, and nitrate thereof, it is possible to implant these elements or the compounds thereof into the ZnS film. By implanting at least one or more kinds of elements or the compounds thereof into the ZnS film, the withstand voltage of the ZnS film is improved, and thus the reliability of the two-terminal device can be enhanced.

Next, a method for implanting the III-group elements into a ZnS film will be described. When a ZnS film is deposited by sputtering, the target obtained by doping, for example, Al in a sintered ZnS target is used. Alternatively, the target may be obtained by mixing Al in highly pure ZnS powders and then densely spreading the resultant mixture all over a quartz glass plate. In this manner, Al is implanted into the ZnS film.

Figure 6:
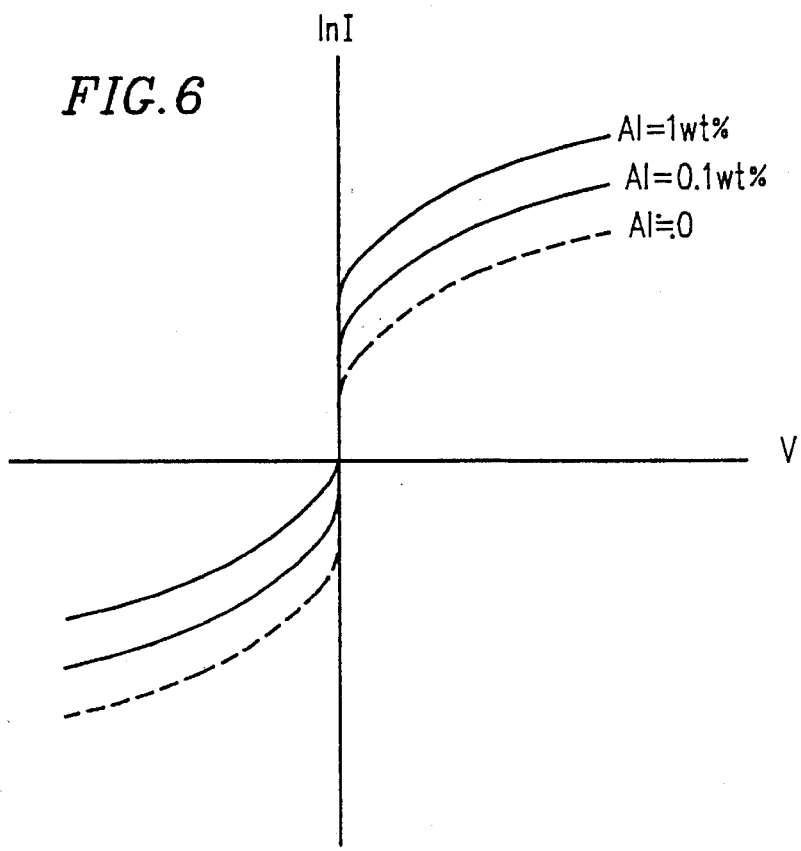
FIG. 6 is a diagram showing the I—V characteristic in the case where the ZnS film in this invention contains aluminum.

FIG. 6 shows the I—V characteristic in the case where Al is implanted into the ZnS film. As is understood from FIG. 6, the I—V characteristic can be changed depending on the dose of Al implanted into the ZnS film. Since the carrier concentration and trapping depth are changed by the Al doping, the curve representing the increase in current with respect to the applied voltage is shifted in the I-axis direction. If another III-group element instead of Al is mixed in with the ZnS powders, and the mixed powders are implanted into the ZnS film, the same effects can be attained.

As mentioned above, the I—V characteristic of the ZnS film can be shifted by varying the amount of Al or other III-group elements included in the ZnS film. Utilizing this fact, a two-terminal device having an optimum I—V characteristic can be obtained in accordance with the electrooptic properties of the display medium used in an LCD apparatus to be produced.

Next, the case where the ZnS film is doped with Zn, so that the composition ratio of Zn to S in the ZnS film is changed will be described. When the ZnS film is to be deposited by sputtering, a target obtained by mixing Zn powder into the ZnS powers is used. FIG. 7 shows the I—V characteristics of ZnS films including Zn in various composition ratios. As is apparent from FIG. 7, the I—V characteristic can be changed by varying the composition ratio of Zn to S in the ZnS film. Since the carrier concentration and trapping depth are changed by changing the composition ratio, the curve representing the increase in current with respect to the applied voltage is shifted in the I-axis direction.

As mentioned above, the I—V characteristic of the ZnS film can be shifted by varying the composition ratio of Zn to S that is included in the ZnS film. Utilizing this fact, a two-terminal device having an optimum I—V characteristic can be obtained in accordance with the electrooptic properties of the display medium used in an LCD apparatus.

In this example, Ta is used for the pixel electrode 2 and the bus line 3. The material used for forming the pixel electrode 2 and the bus line 3 is sufficient insofar as the material is not etched during the etching of the ZnS film formed thereon. Also, the insulator layer 5 is not limited to the organic type photosensitive resin. Other materials such as silicon oxide, and silicon nitride can be used as the insulator layer 5.

This example is applicable to a transmission-type LCD apparatus. In such a case, similar to Example 2 which will be described below, ITO, for example, is used as the first conductor for forming a transparent pixel electrode, and titanium (Ti), for example, is used as the second conductor for forming the bus line. On the protrusion of the pixel electrode, an island-like electrode is formed using Ti which is used for forming the bus line, and the island-like electrode is used as the lower electrode of one of the MSM active devices. Thus, the symmetry of the I—V characteristic of the active device can be improved.

The production method in the case where this example is applied to the transmission-type LCD apparatus can be understood by anyone having ordinary skills in the art with reference to the description of Example 2 below, so that the detailed description thereof is omitted.

EXAMPLE 2

Figure 8A:
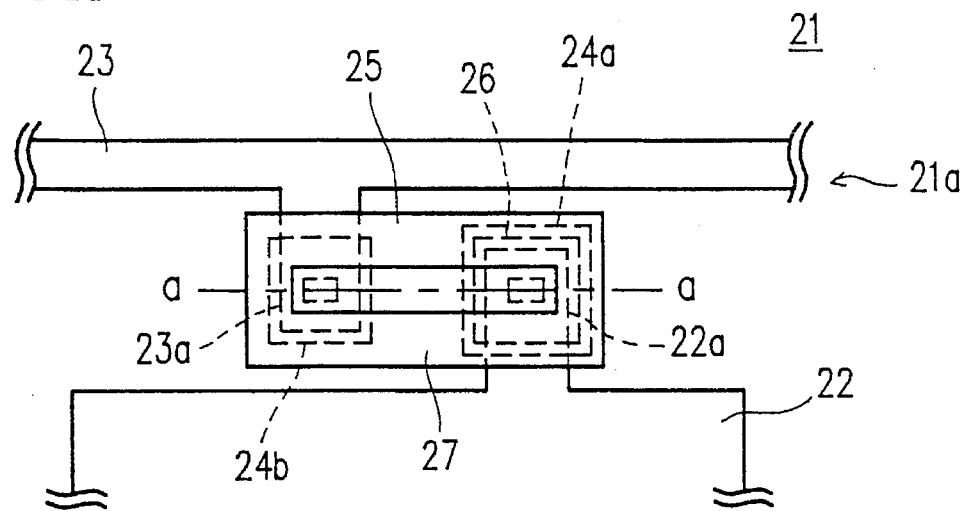
FIG. 8A is a plan view showing a two-terminal device portion corresponding to one pixel on a substrate with devices of an LCD apparatus in Example 2 according to the invention.
Figure 8B:
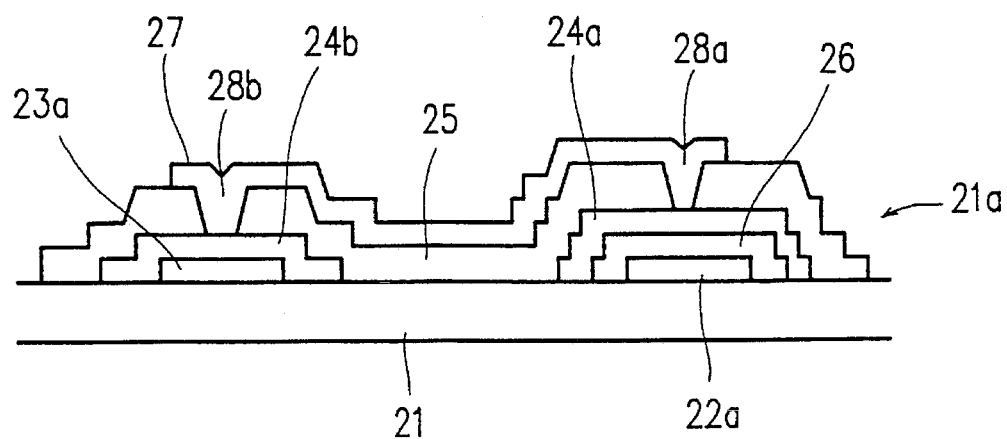
FIG. 8B is a cross-sectional view taken along the line a—a in FIG. 8A.

FIG. 8A is a plan view showing a one part portion of a substrate with devices of the LCD apparatus in Example 2. FIG. 8B shows a cross section taken along the line a—a in FIG. 8A.

As shown in FIGS. 8A and 8B, in the substrate 21a, a pixel electrode 22 formed of a first conductor and a bus line 23 formed of a second conductor are formed on a glass substrate 21. In this example, the first conductor is ITO and the second conductor is titanium (Ti). Various other materials can be selected as these conductors. The pixel electrode 22 includes a branched protrusion 22a extending toward the bus line 23, and the bus line 23 includes a branched protrusion 23a extending toward the pixel electrode 22. On the protrusion 22a of the pixel electrode 22, an island-like electrode 26 made of Ti is formed.

A first nonlinear resistive layer 24a is formed so as to cover the island-like electrode 26, and a second nonlinear resistive layer 24b is formed so as to overlap part of the protrusion 23a of the bus line 23. The main component of the nonlinear resistive layers 24a and 24b in this invention is ZnS which is a compound semiconductor. In the following description, a film containing ZnS as its main component is referred to as a ZnS film, for convenience.

An insulator film 25 is formed so as to cover the entire first and second nonlinear resistive layers 24a and 24b. The insulator layer 25 has through-holes 28a and 28b at positions corresponding to the first and second nonlinear resistive layers 24a and 24b. A connecting electrode 27 of a third conductor is formed on the insulator layer 25. In this example, the third conductor is aluminum (Al). The connecting electrode 27 is connected to the first nonlinear resistive layer 24a via the first through-hole 28a, and connected to the second nonlinear resistive layer 24b via the second through-hole 28b, whereby the first and the second nonlinear resistive layers 24a and 24b are electrically connected to each other.

Figure 11B:
FIG. 11B is an equivalent circuit diagram of a two-terminal device having a back-to-back structure in the LCD apparatus in Example 2 according to the invention.
Figure 12A:
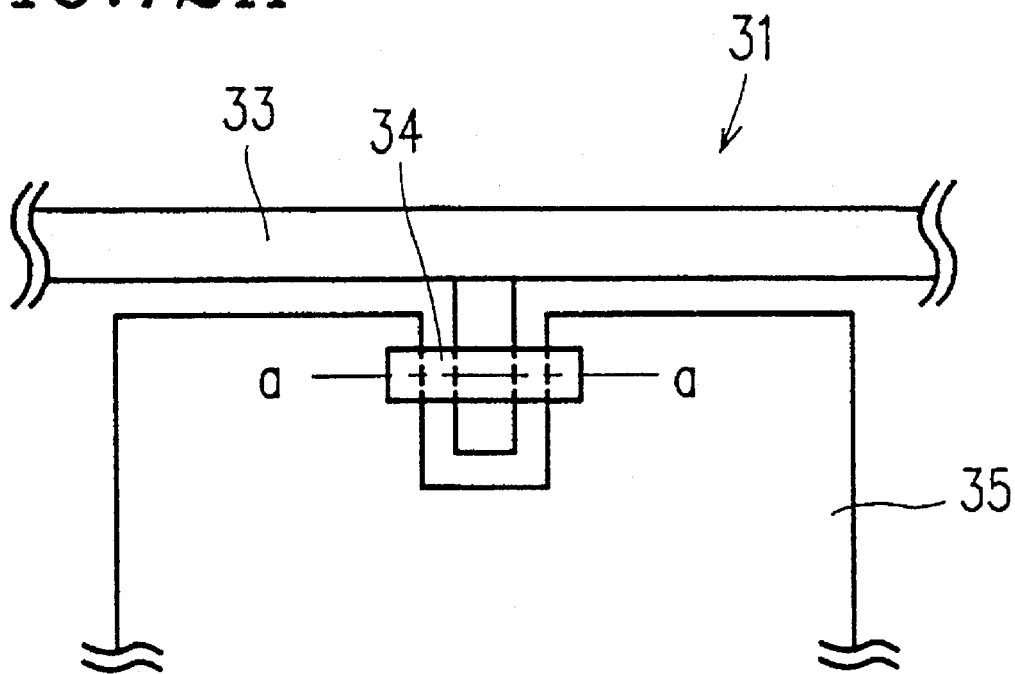
FIG. 12A is a plan view showing a two-terminal device portion corresponding to one pixel on a substrate with devices of a conventional LCD apparatus.
Figure 12B:
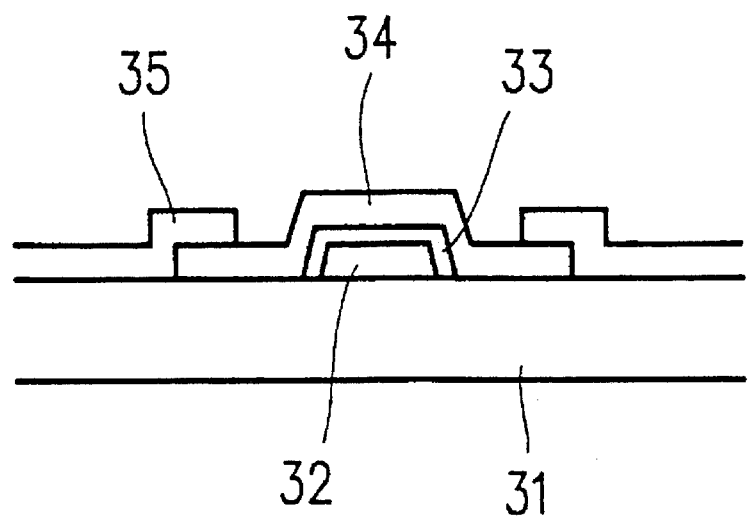
FIG. 12B is a cross-sectional view taken along a line a—a in FIG. 12A.

The LCD apparatus having the above construction includes a first switching device and a second switching device. The first switching device has an MSM (Metal-Semiconductor-Metal) three-layer structure. The MSM structure of the first switching device includes the island-like electrode 26, the connecting electrode 27, and the first nonlinear resistive layer 24a interposed therebetween. The second switching device also has an MSM three-layer structure. The MSM structure of the second switching device includes the connecting electrode 27, the protrusion 23a of the bus line 23, and the second nonlinear resistive layer 24b interposed therebetween. The first and second switching devices are coupled in series at opposite polarities, so as to form a back-to-back structure. The equivalent circuit of the back-to-back structure is shown in FIG. 11B.

Figure 9A:
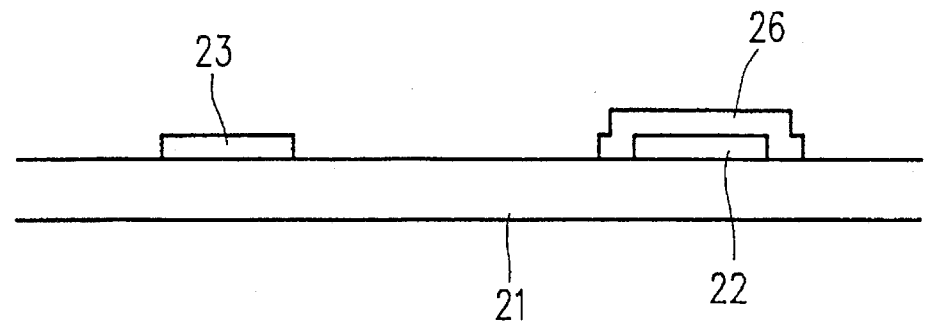
FIGS. 9A, 9B, and 9C are cross-sectional views for illustrating the production process of the substrate with devices of the LCD apparatus in Example 2 according to the invention.
Figure 9B:
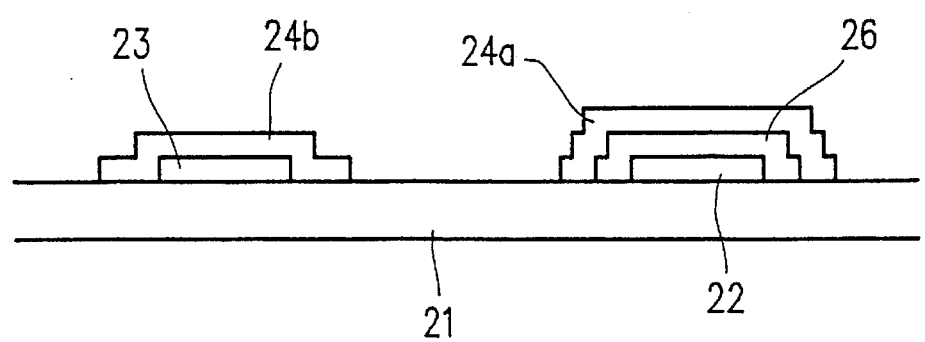
Figure 9C:
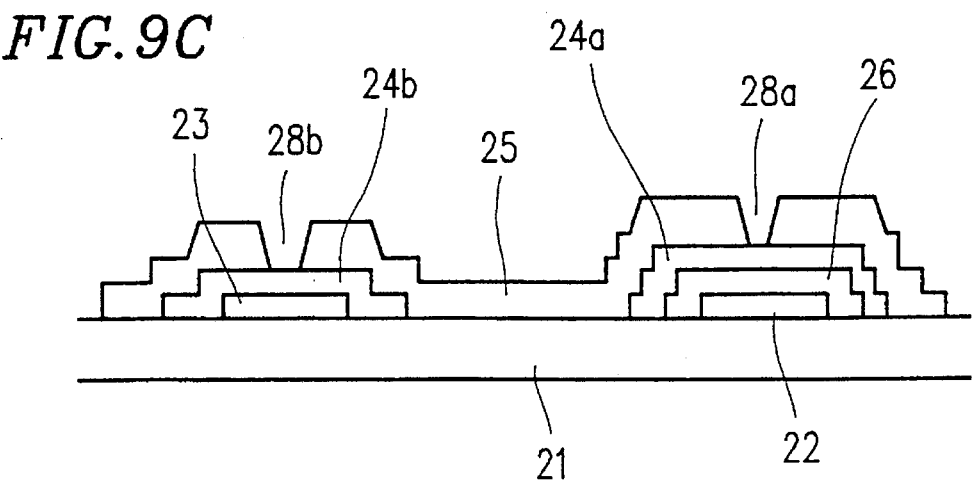

Next, the production process of the LCD apparatus having the above-described construction will be described with reference to FIGS. 9A to 9C. These figures show the cross sections taken along the line a—a in FIG. 8A.

First, the substrate 21a is produced in the following manner. On the entire surface of the glass substrate 21 (e.g., borosilicate glass #7059 manufactured by Corning Inc.), an ITO film is deposited by sputtering so as to have a thickness of about 300 nm. Next, after the photolithography process, wet etching is performed using oxalic acid, or the like, so as to pattern the pixel electrode 22.

Next a Ti film is formed so as to have a thickness of about 300 nm on the entire face of the glass substrate 21. After the photolithography process, etching is performed using a mixture of hydrofluoric acid and nitric acid (hydrofluoric acid: nitric acid is about in the range of 1:100 to 1:400), so as to pattern the bus line 23 and the island-like electrode 26 (FIG. 9A). The island-like electrode 26 is formed so as to overlap part of the protrusion 22a of the pixel electrode 22 (see FIG. 9A). By using the same material to form the island-like electrode 26 and the bus line 23, the electrical symmetry of the active device can be improved.

Next, by sputtering a ZnS target with Ar gas, the ZnS film having a thickness of about 150 nm is formed on the entire of the glass substrate 21. The formation method and the conditions for the formation of the ZnS film are the same as in Example 1. Then, a mixed acid of phosphoric acid, nitric acid, and acetic acid is used as an etchant, and the nonlinear resistive layer 24a and the second nonlinear resistive layer 24b are patterned into independent island-like shapes, as shown in FIG. 9B.

Next, by spinner coating, an organic-type insulating photosensitive resin is applied on the entire surface of the glass substrate 21. The photosensitive resin has a thickness of about 500 nm, in this example. After the exposure using a photomask, development is performed using a prescribed developer, so as to form the insulator layer 25 having through-holes 28a and 28b in an island-like pattern, as shown in FIG. 9C. The insulator layer 25 is patterned so as to completely cover the first and second nonlinear resistive layers 24a and 24b (see FIG. 8A).

The formation of the insulator layer using the photosensitive resin has an advantage that the process can be simplified as compared with other methods for forming an insulating film. As the photosensitive resin, for example, acrylic resin, polyimide, polyamide, polymethyl methacrylate, and the like may be used.

Next, an Al film is deposited by sputtering so as to have a thickness of about 300 nm, and then the photolithography process is performed. Thereafter, the patterning is performed by wet etching by using a phosphoric acid, or a mixed acid of phosphoric acid, nitric acid, and acetic acid, to form the connecting electrode 27, as shown in FIG. 8B. At this time, while the Al film is being etched, the nonlinear resistive layers 24a and 24b are protected from the etchant, because the nonlinear resistive layers 24a and 24b are covered with the Al layer and the insulator layer 25 under the photoresist. Therefore, the nonlinear resistive layers 24a and 24b may be formed of materials with poor resistance to the etchant.

The thus produced LCD apparatus includes an active device having an MSM structure using ZnS which is a compound semiconductor, as the nonlinear resistive layer. In the I—V characteristic of the active device, the ON/OFF ratio, i.e., $I_{20V}/I_{5V}$ is $10^4$. This shows that the I—V characteristic achieves very high steepness as compared with the conventional MIM device using $Ta_2O_5$ as the nonlinear resistive layer.

Figure 10:
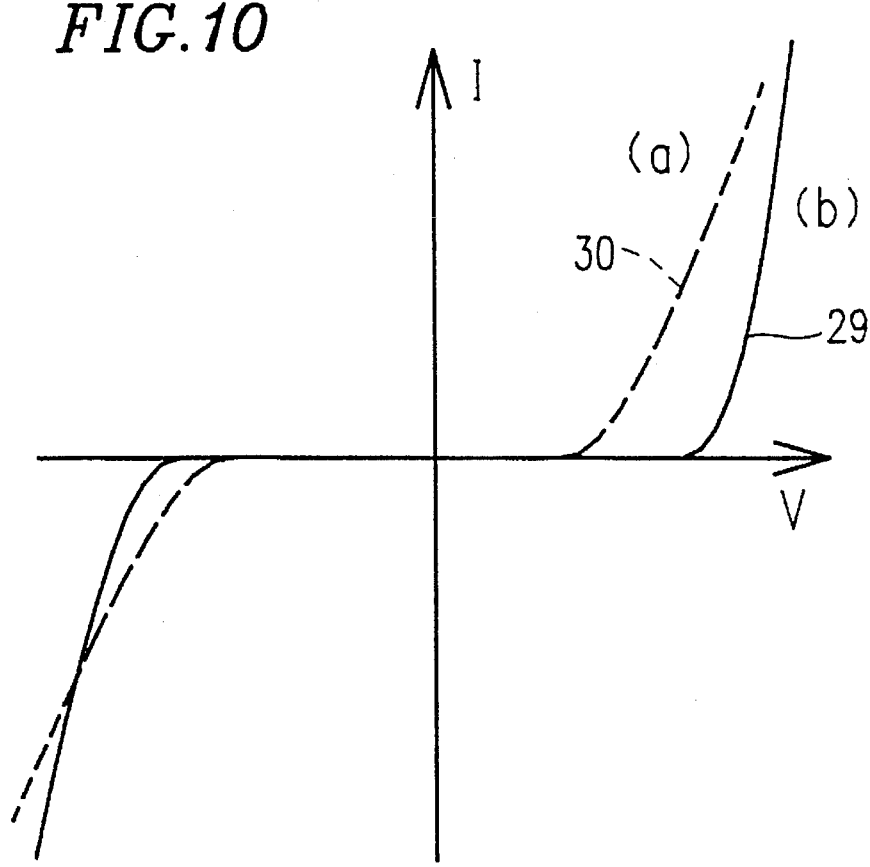
FIG. 10 is a diagram showing the I—V characteristic of an active device in Example 2 of the invention and the I—V characteristic of a conventional active device for comparison.

In this example, FIG. 10 shows the I—V characteristic of the MSM active device indicated by curve 29 compared with the I—V characteristic of a conventional MIM active device indicated by curve 30. As is understood from FIG. 10, in the case where ZnS is used as the nonlinear resistive film, the I—V characteristic increases in steepness. In addition, this example adopts the back-to-back structure in which the upper electrodes (the connecting electrodes) of the two MSM devices are made of the same material and the lower electrodes (the bus line 23 and the island-like electrode 26) are also formed of the same material, so that the symmetry with respect to the polarity of the applied voltage is improved. The back-to-back structure has a substantial parasitic capacitance which is half as compared with the case where a single active device is used, so that the occurrence of crosstalk of the LCD apparatus can be greatly reduced. The active devices of this example have a higher threshold voltage as compared with the active devices in the ring structure described in Example 1.

The composition ratio of Zn to S of ZnS used for the nonlinear resistive layers 24a and 24b is not necessarily determined by the stoichiometry (i.e., the ratio in number between Zn atoms and S atoms=1:1). By shifting the composition ratio of Zn to S from the stoichiometric ratio, the I—V characteristic of the active device can be changed. In addition, in order to enhance the performance of the active device, ZnS may be doped with a small dose of an element selected from rare earth elements such as terbium (Tb), samarium (Sm), and europium (Eu), the III-group elements such as aluminum and gallium, manganese, copper, or compounds thereof.

In this example, ITO is used for the pixel electrode 22, and Ti is used for the bus line 23. The materials used for forming the pixel electrode 22 and the bus line 23 are sufficient insofar as the materials are not etched during the etching of the ZnS film formed thereon. Also, the insulator layer 25 is not limited to the organic type photosensitive resin. Other materials such as silicon oxide, and silicon nitride can be used as the insulator layer 25.

This example is applicable to a reflection-type LCD apparatus. In such a case, similar to Example 1 described above, Ta, for example, is used as the first conductor for forming a pixel electrode 22, and is also used as the second conductor for forming the bus line 23. In this case, the pixel electrode and the bus line are formed of the same material, so that it is unnecessary to additionally provide an island-like electrode. The production method in the case where this example is applied to the reflection-type LCD apparatus can be sufficiently understood by anyone having ordinary skills in the art with reference to the description of Example 1, so that the detailed description thereof is omitted.

Examples 1 and 2 are an active device having an MSM structure using ZnS as the nonlinear resistive layer, so that the I—V characteristic with higher steepness can be realized. Thus, it becomes possible to drive liquid crystal with less steep voltage-to-transmittance curve. The characteristic of the active device can be controlled by various parameters such as the composition ratio of Zn to S in ZnS, the type and the concentration of the dopant included in ZnS, and the type and the thickness of the insulator layer.

By forming the active elements into a ring structure, the electrical symmetry can be improved. By forming the island-like electrode of the same material as the bus line so as to cover the lower electrode (a projecting portion of the pixel electrode), the same materials can be used for the three layers in the MSM structures of the two active devices, and the symmetrical property of the two two-terminal devices can be improved. Alternatively, by forming the two active devices into a back-to-back structure, the symmetry of the device can be improved.

In addition, through-holes are used for connecting the nonlinear resistive layers to the upper electrodes, so that any step is not caused in a portion which functions as an active device. Therefore, the occurrence of leakage current can advantageously be prevented.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display apparatus for performing a display by modulating an optical characteristic of a display medium, the display apparatus comprising: a plurality of pixel electrodes for allowing the display medium to perform a display in accordance with a display signal; switching elements, respectively provided for the corresponding pixel electrodes, for applying the display signal to the respective pixel electrodes in nonlinear response to a received driving signal; and a bus line for applying the driving signal to the switching elements, wherein:

each of the switching elements includes a first active device and a second active device;

the first active device includes a lower electrode connected to a corresponding one of the pixel electrodes, an upper electrode connected to the bus line, and a nonlinear resistive layer interposed between the lower electrode and the upper electrode;

the second active device includes a lower electrode connected to the bus line, an upper electrode connected to the corresponding pixel electrode, and a nonlinear resistive layer interposed between the lower electrode and the upper electrode;

each of the nonlinear resistive layers of the first and the second active elements contains zinc sulfide as its main component main component, and wherein the zinc sulfide which is the main component of the nonlinear resistive layers contains a rare earth element, a group III element, iron, nickel, copper, manganese, or a compound thereof.

2. A liquid crystal display apparatus according to claim 1, wherein each of the first and the second active devices includes an insulating film formed between the upper electrode and the nonlinear resistive layer, and the upper electrode is connected to the nonlinear resistive layer via a through-hole provided through the insulating film.

3. A liquid crystal display apparatus according to claim 2, wherein the insulating layer is an organic type photosensitive resin.

4. A liquid crystal display apparatus according to claim 1, wherein the lower electrode of the first active device is part of the corresponding pixel electrode, and the lower electrode of the second active device is part of the bus line.

5. A liquid crystal display apparatus according to claim 4, wherein the plurality of pixel electrodes are made of the same material as that of the bus line.

6. A liquid crystal display apparatus according to claim 4, wherein the first active device includes an island-like electrode formed of the same material as that for the bus line, the island-like electrode being formed between the part of the corresponding pixel electrode and the nonlinear resistive layer.

7. A liquid crystal display apparatus according to claim 1, wherein a composition ratio of zinc to sulfur in zinc sulfide, which is the main component of the nonlinear resistive layers, is different from a stoichiometric ratio.

8. A liquid crystal display apparatus for performing a display by modulating an optical characteristic of a display medium, the display apparatus comprising: a plurality of pixel electrodes for allowing the display medium to perform a display in accordance with a display signal; switching elements, respectively provided for the corresponding pixel electrodes, for applying the display signal to the respective pixel electrodes in nonlinear response to a received driving signal; and a bus line for applying the driving signal to the switching elements, wherein:

each of the switching elements includes a first active device and a second active device;

the first active device includes a lower electrode connected to a corresponding one of the pixel electrodes, an upper electrode, and a nonlinear resistive layer interposed between the lower electrode and the upper electrode;

the second active device includes a lower electrode connected to the bus line, an upper electrode connected to the upper electrode of the first active device, and a nonlinear resistive layer interposed between the lower electrode and the upper electrode;

each of the nonlinear resistive layers of the first and the second active elements contains zinc sulfide as its main component, and wherein the zinc sulfide which is the main component of the nonlinear resistive layers contains a rare earth element, a group III element, iron, nickel, copper, manganese, or a compound thereof.

9. A liquid crystal display apparatus according to claim 8, wherein each of the first and the second active devices includes an insulating film formed between the upper electrode and the nonlinear resistive layer, and the upper electrode is connected to the nonlinear resistive layer via a through-hole provided through the insulating film.

10. A liquid crystal display apparatus according to claim 9, wherein the insulating layer is an organic type photosensitive resin.

11. A liquid crystal display apparatus according to claim 8, wherein the lower electrode of the first active device is part of the corresponding pixel electrode, and the lower electrode of the second active device is part of the bus line.

12. A liquid crystal display apparatus according to claim 11, wherein the plurality of pixel electrodes are made of the same material as that for the bus line.

13. A liquid crystal display apparatus according to claim 11, wherein the first active device includes an island-like electrode formed of the same material as that for the bus line, the island-like electrode being formed between the part of the corresponding pixel electrode and the nonlinear resistive layer.

14. A liquid crystal display apparatus according to claim 8, wherein a composition ratio of zinc to sulfur in zinc sulfide, which is the main component of the nonlinear resistive layers, is different from a stoichiometric ratio.

15. A liquid crystal display apparatus comprising:

a first substrate having a plurality of pixel electrodes, nonlinear resistance devices provided for the respective pixel electrodes, and a bus line for operating the nonlinear resistance devices;

a second substrate which faces the first substrate; and a display medium interposed between the first and the second substrates, wherein each of the nonlinear resistance devices includes:

a first nonlinear resistive layer formed on a predetermined portion of a corresponding one of the pixel electrodes;

a second nonlinear resistive layer formed on a predetermined portion of the bus line, the second nonlinear resistive layer is separated and insulated from the first nonlinear resistive layer;

an insulator layer which covers the first and the second nonlinear resistive layers, and has a first through-hole positioned above the first nonlinear resistive layer and a second through-hole positioned above the second nonlinear resistive layer;

a first connecting electrode for connecting the first nonlinear resistive layer to the bus line via the first through-hole; and a second connecting electrode for connecting the second nonlinear resistive layer to the pixel electrode via the second through-hole, and wherein each of the first and the second nonlinear resistive layers contains zinc sulfide as its main component, and wherein the zinc sulfide which is the main component of the nonlinear resistive layers contains a rare earth element, a group III element, iron, nickel, copper, manganese, or a compound thereof.

16. A liquid crystal display apparatus according to claim 15, wherein the plurality of pixel electrodes are made of the same material as that for the bus line.

17. A liquid crystal display apparatus according to claim 15, wherein an island-like electrode is formed between the pixel electrode and the first nonlinear resistive layer, the island-like electrode being formed of the same material as that for the bus line.

18. A liquid crystal display apparatus according to claim 15, wherein a composition ratio of zinc to sulfur in zinc sulfide, which is the main component of the first and the second nonlinear resistive layers, is different from a stoichiometric ratio.

19. A liquid crystal display apparatus according to claim 15, wherein the insulating layer is an organic type photosensitive resin.

20. A liquid crystal display apparatus comprising:

a first substrate having a plurality of pixel electrodes, nonlinear resistance devices provided for the respective pixel electrodes, and a bus line for operating the nonlinear resistance devices;

a second substrate which faces the first substrate; and a display medium interposed between the first and the second substrates, wherein each of the nonlinear resistance devices includes:

a first nonlinear resistive layer formed on a predetermined portion of a corresponding one of the pixel electrodes;

a second nonlinear resistive layer formed on a predetermined portion of the bus line, the second nonlinear resistive layer is separated and insulated from the first nonlinear resistive layer;

an insulator layer which covers the first and the second nonlinear resistive layers, and has a first through-hole positioned above the first nonlinear resistive layer and a second through-hole positioned above the second nonlinear resistive layer; and a connecting electrode connected to the first nonlinear resistive layer via the first through-hole, and connected to the second nonlinear resistive layer via the second through-hole, and wherein each of the first and the second nonlinear resistive layers contains zinc sulfide as its main component, and wherein the zinc sulfide which is the main component of the nonlinear resistive layers contains a rare earth element, a group III element, iron, nickel, copper, manganese, or a compound thereof.

21. A liquid crystal display apparatus according to claim 20, wherein the plurality of pixel electrodes are made of the same material as that for the bus line.

22. A liquid crystal display apparatus according to claim 20, wherein an island-like electrode is formed between the pixel electrode and the first nonlinear resistive layer, the island-like electrode being formed of the same material as that for the bus line.

23. A liquid crystal display apparatus according to claim 20, wherein a composition ratio of zinc to sulfur in zinc sulfide, which is the main component of the first and the second nonlinear resistive layers, is different from a stoichiometric ratio.

24. A liquid crystal display apparatus according to claim 20, wherein the insulating layer is an organic type photosensitive resin.

25. A method for producing a liquid crystal display apparatus comprising the steps of:

forming a pixel electrode by patterning a first conductor on an insulating substrate;

forming a bus line by patterning a second conductor on the insulating substrate;

forming a first nonlinear resistive layer containing zinc sulfide as its main component and a dopant selected from a rare earth element, a group III element, iron, nickel, copper, manganese, or a compound thereof on a predetermined portion of the pixel electrode, and forming a second nonlinear resistive layer containing zinc sulfide as its main component and a dopant selected from a rare earth element, a group III element, iron, nickel, copper, manganese, or a compound thereof on a predetermined portion of the bus line, the first nonlinear resistive layer and the second nonlinear resistive layer being separated and insulated from each other;

forming an insulator layer for covering the first and the second nonlinear resistive layers, the insulator layer having a first through-hole positioned above the first nonlinear resistive layer and a second through-hole positioned above the second nonlinear resistive layer; and forming a first connecting electrode for connecting the first nonlinear resistive layer to the predetermined portion of the bus line via the first through-hole, and forming a second connecting electrode for connecting the second nonlinear resistive layer to the predetermined portion of the pixel electrode via the second throughhole.

26. A method for producing a liquid crystal display apparatus according to claim 25, wherein the first conductor is the same material as the second conductor, and the step of forming the bus line and the step of forming the pixel electrode are simultaneously performed.

27. A method for producing a liquid crystal display apparatus according to claim 25, wherein, in the step of forming the bus line, an island-like electrode which covers the predetermined portion of the pixel electrode is simultaneously formed of the second conductor.

28. A method for producing a liquid crystal display apparatus comprising the steps of:

forming a pixel electrode by patterning a first conductor on an insulating substrate;

forming a bus line by patterning a second conductor on the insulating substrate;

forming a first nonlinear resistive layer containing zinc sulfide as its main component and a dopant selected from a rare earth element, a group III element, iron, nickel, copper, manganese, or a compound thereof on a predetermined portion of the pixel electrode, and forming a second nonlinear resistive layer containing zinc sulfide as its main component and a dopant selected from a rare earth element, a group III element, iron, nickel, copper, manganese, or a compound thereof on a predetermined portion of the bus line, the first nonlinear resistive layer and the second nonlinear resistive layer being separated and insulated from each other;

forming an insulator layer for covering the first and the second nonlinear resistive layers, the insulator layer having a first through-hole positioned above the first nonlinear resistive layer and a second through-hole positioned above the second nonlinear resistive layer; and forming a connecting electrode connected to the first nonlinear resistive layer via the first throughhole, and connected to the second nonlinear resistive layer via the second through-hole.

29. A method for producing a liquid crystal display apparatus according to claim 28, wherein the first conductor is the same material as the second conductor, and the step of forming the bus line and the step of forming the pixel electrode are simultaneously performed.

30. A method for producing a liquid crystal display apparatus according to claim 28, wherein, in the step of forming the bus line, an island-like electrode which covers the predetermined portion of the pixel electrode is simultaneously formed of the second conductor.

* * * * *